Figure 1:
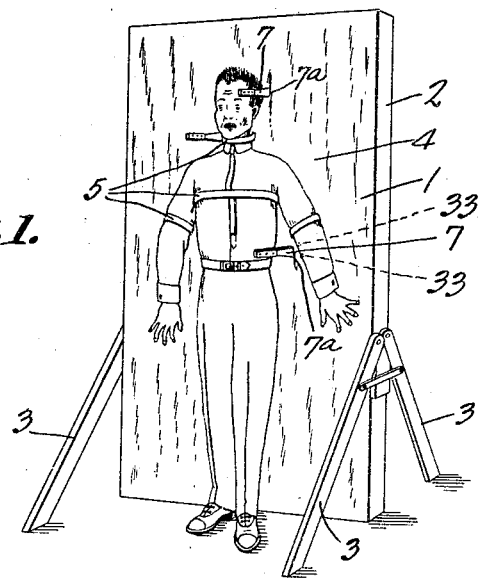

E. DE MOULIN.
KNIFE THROWING ILLUSION.
APPLICATION FILED JAN. 29, 1916.

1,200,472.

Patented Oct. 10, 1916.
2 SHEETS—SHEET 1.

Witnesses

Erastus De Moulin, Inventor by Attorneys

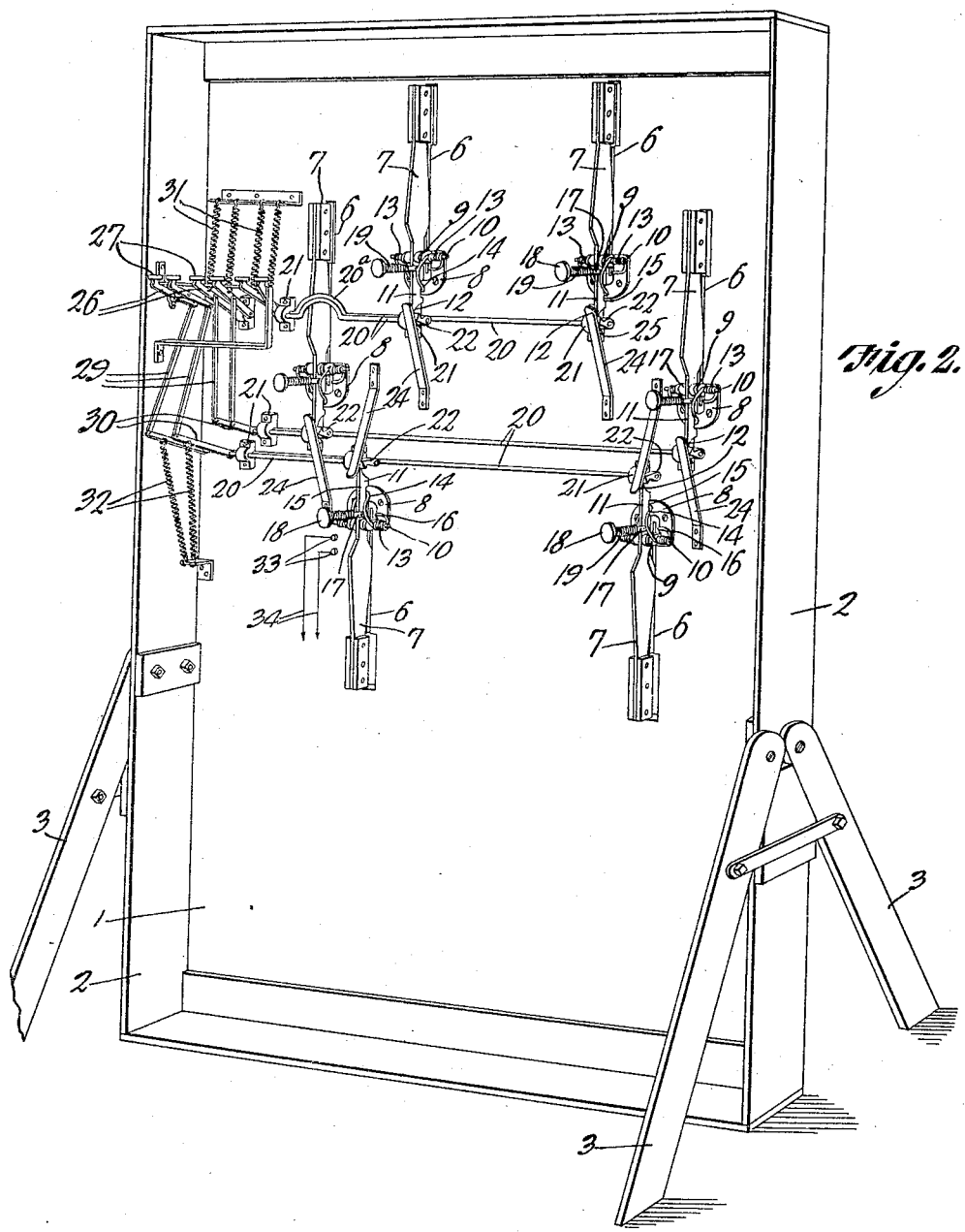

UNITED STATES PATENT OFFICE.

ERASTUS DE MOULIN, OF GREENVILLE, ILLINOIS.

KNIFE-THROWING ILLUSION.

1,200,472.

Specification of Letters Patent.

Patented Oct. 10, 1916.

Application filed January 29, 1916. Serial No. 75,063.

*To all whom it may concern:*

Be it known that I, ERASTUS DE MOULIN, a citizen of the United States, residing at Greenville, in the county of Bond and State of Illinois, having invented a new and useful Knife-Throwing Illusion, of which the following is a specification.

The present invention appertains to illusionary apparatus, such as are used by lodges and other organizations for initiating candidates, and aims to provide a novel illusionary apparatus of the knife throwing type.

The invention embodies a board or back to which the candidate is strapped or fastened in any other suitable manner and the knife thrower who may be suitably garbed or costumed, stands a distance in front of the board, and makes such movements as to apparently throw or sling the knives he possesses toward the board, the knives appearing to strike and sink into the board adjacent the candidate, to give him the impression that the knives are actually being thrown around him, this deception being accomplished by the provision of knives behind the board which are thrown forwardly through slots in the board in such a manner as to create a thud similar to that produced when a knife is thrown against a board to stick into it.

The apparatus is absolutely harmless, but is quite completely deceptive, since the thrower apparently throws the knives with great velocity, so that they cannot be seen by the candidate, and the knives apparently strike the board with considerable force, thus producing a practically real effect.

The apparatus cannot only be employed as an initiating means, but can be used as an illusion upon stages, and the like, when it is desired to imitate a knife throwing performance with apparent reality, but with safety and without requiring a skilled knife thrower.

It is the object of the invention to provide novel means for mounting the knives in rear of the board whereby they can be thrown forwardly one at a time, as the thrower apparently throws his knives toward the board.

Another object of the invention is the provision of novel means for controlling the knives.

A further feature of the invention resides in the fact that the board may be provided with electrical electrodes to contact with the candidate adjacent the points where the knives are located, whereby when a knife is thrown forward, the operator can turn on an electrical current to shock the candidate adjacent the knife, so that the candidate receives the impression that he is actually cut.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 3:
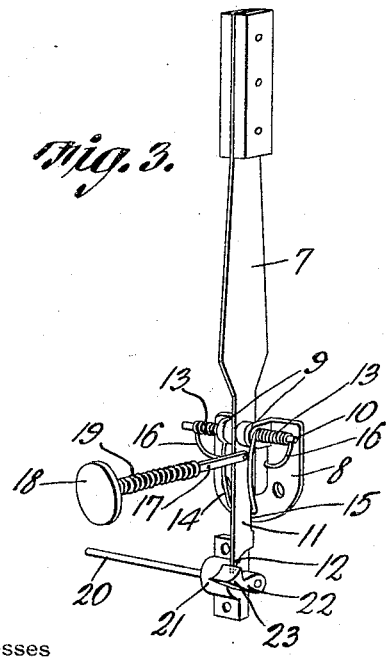
Figure 4:
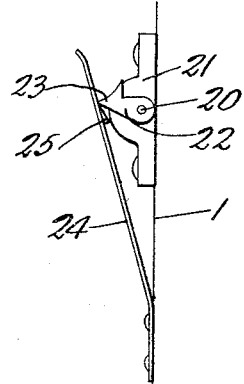

Figure 1 is a perspective view showing the front of the board with the candidate strapped thereto. Fig. 2 is a perspective view on a larger scale illustrating the rear of the board and mechanism carried thereby. Fig. 3 is an enlarged perspective view illustrating one knife and its mounting. Fig. 4 is an enlarged side elevation of one of the knife detents and its catch.

In carrying out the invention, there is provided an upright board or back-ground 1 constructed of any suitable material, which need only be thin, the board 1 being provided with a marginal rearwardly projecting flange 2, to give the board the appearance of being thick. This board can be supported in a vertical position in any suitable manner, for example, by means of legs or braces 3 attached thereto and resting upon the floor as does also the lower end of the board 1. The front surface of the board 1 is preferably covered with cloth or equivalent material, which may be painted to represent the bark of a tree, and the candidate is strapped, as at 5, or otherwise fastened to the board 1, as seen in Fig. 1.

The board 1 is provided with vertical slots 6 at points adjacent the candidate, such as, at the sides of his head, between his arms and body, or the like. The slots 6 are for the passage of the knives 7 therethrough, the cloth or covering 4 of the board being slit, as at 7ª, for the passage of the knives 7, so that the cloth or facing will normally prevent said slots from being exposed, although the knives can readily pass through the slits 7ª.

The knives 7 are pivotally mounted in rear of the board to swing in vertical planes, the knives in the actual knife throwing performance being thrown to rotate in vertical planes, and in order to pivotally mount the blades for rotation about horizontal axes, the end of the blade of each knife 7 is pivotally mounted upon a horizontal pin 10 engaged through a pair of rearwardly projecting ears 9 with which the terminals of a U-shaped bearing 8 are provided, said bearing being secured in any suitable manner to the rear surface of the board at one end of the respective slot 6. The end of each blade is provided with a longitudinal extension 11 having a pointed tip 12. The knives are spring pressed, to spring forwardly when they are released, and to this end a wire spring is provided for each knife, said spring embodying coils 13 embracing the protruding end portions of the pin 10, and a loop-shaped yoke 14 connecting the adjacent ends of said coils 13 and having its bend working in a cut away portion 15 with which the respective edge of the extension 11 is provided. The terminals of the spring project from the remote ends of the coils 13 and bear against the bearing 8, as at 16, whereby the coils 13 tend to swing the yoke 14 in such a direction as to swing the knife forwardly through the slot 6.

A stem 17 is secured to each extension 11 perpendicular therewith, and is provided at its free end with a head or knob 18, said stems normally projecting rearwardly. The stems 17 are preferably provided with springs 19 whereby the knobs 18 can yield. The knobs 18 are arranged to strike the board when the knives are released, to thus produce a thud or noise resembling that when a knife is actually stuck into a wooden board by throwing the knife against it.

In order to normally hold the knives in vertical positions behind the slots 6, a transverse or horizontal rock shaft 20 is provided for each knife, the same being journaled in suitable bearings 21 attached to the rear surface of the board. Secured to each shaft 20 is a rearwardly projecting hook-shaped detent 22 engageable with the tip 12 of the extension 11 to hold the knife 7 in normal position as long as the detent is maintained in place.

Each detent 22 has a tip 23 whereby the detent can be held in released position, and in this connection a leaf spring 24 is secured to the rear surface of the board adjacent each detent 22 and bears against the tip 23 thereof, said leaf spring 24 having a beveled lug 25 with which the tip 23 is engageable. The leaf spring 24 provides a catch for holding the detent 22 in released position, since when the detent 22 is swung to released position, the tip 23 thereof slides past and moves under the shoulder of the lug 25, so that the tension of the spring 24 will hold the detent 22 in released position, until the detent is forcibly swung back to normal position.

In order to selectively release the knives, a rearwardly projecting set of levers 26 are fulcrumed to the rear surface of the board and are provided at their free ends with finger keys 27, said levers being preferably arranged adjacent one edge of the board, in order that the operator can look in front of the board to observe the movements of the knife thrower, so that the knives can be released at the proper time. As illustrated, two of the levers 26 are attached to the ends of the upper shafts 20, said shafts having arcuate portions 20ª to accommodate the respective knife 7. The other levers 26 are connected by links 29 with rearwardly projecting arms 30 attached to the ends of the lower shafts 20. The levers 26 are preferably connected to those ends of the shafts 20 adjacent one edge of the board, while the detents 22 are attached to the other ends thereof. Retractile springs 31 connect certain of the levers 26 and the board 1, to normally swing said levers upwardly to hold the respective detents 22 in place, and the arms 30 of the other levers 26 are connected by retractile springs 32 with the board, to hold the other detents in place. The shafts 20 and their levers are thus spring pressed to normally hold them in knife engaging position, and to return the detents to knife engaging position when they are released.

In operation, when the knife thrower apparently throws a knife toward the board, the attendant or assistant in rear of the board depresses the proper key 27, to thus rotate the corresponding shaft 20 for releasing its detent 22 from the extension 11 of the selected knife. Said knife will therefore be swung forwardly through the slot 6 by a quick or sharp movement, and the knob 18 in striking the board will produce a thud or jar, as if the knife had actually struck and sunk into the board. When the respective lever 26 is depressed, to release the detent, the tip 23 of the detent moves past the respective lug 25, and the spring or catch 24 therefore holds the detent 22 in released position, to hold the lever 26 depressed. This will prevent the lever 26 from returning to normal position, which if it occurred would be objectionable since the attendant might depress the same lever the second time with no result. The levers 26 are thus held in depressed position. After all of the knives have been released, and when the apparatus is again to be set for a new candidate, the knives are swung backwardly to normal position, and the levers 26 are forcibly raised, thereby returning the detents 22 to normal position for holding the knives in place.

In order that the deception may be carried further, a pair of electrodes 33 can be carried by the board 1 so as to contact with the arm or other portion of the candidate adjacent the respective knife, electrical conductors 34 being connected to the electrodes 33, whereby when the respective knife is thrown forward, a statical or other electrical current can be switched on automatically or separately, to shock the candidate by the electrical charge passing between the electrodes. This electrical shock will give the candidate the impression that he is actually cut by the knife, which has apparently been misdirected. These electrodes need only be used for the last knife, although the electrodes can be used with each knife, if desired, but this is a mere duplication or multiplication.

The present apparatus provides an effective illusion, for the entertainment of the onlookers, and the deception of the candidate, giving a good test of the candidate's ability to withstand the ordeal.

The knives are arranged to wedge into place when they spring forwardly, which may be accomplished by suitable wedge plates, for preventing the rebound of the knives.

Having thus described the invention, what is claimed as new is:

1. A knife throwing illusion apparatus embodying a board having a slot, a knife mounted behind said slot and movable therethrough.

2. A knife throwing illusion apparatus embodying a board having a slot, a knife mounted behind said slot and movable forwardly therethrough, and means for producing a thud when the knife is moved through the slot.

3. A knife throwing illusion apparatus embodying a board having a slot, a knife mounted behind said slot to move therethrough, and spring means for moving the knife through said slot.

4. A knife throwing illusion apparatus embodying a board having a slot, a knife mounted behind said slot to move therethrough, spring means for moving the knife through said slot, and means for producing a thud when the knife is moved through said slot.

5. A knife throwing illusion apparatus embodying a board having a slot, a knife mounted behind said slot and movable therethrough, spring means for moving said knife through said slot, and a detent for normally holding said knife behind said slot.

6. A knife throwing illusion apparatus embodying a board having a slot, a knife mounted behind said slot and movable therethrough, spring means for moving said knife through said slot, a detent for normally holding said knife behind said slot, and means carried by the knife to contact with the board for producing a thud when the knife is moved through said slot.

7. A knife throwing illusion apparatus embodying a board having a slot, a knife movable forwardly through said slot, and means carried by said knife to contact with the board for producing a thud when the knife is moved through said slot.

8. A knife throwing illusion apparatus embodying a board having a slot, a knife movable forwardly through said slot from behind the board, and means adjacent said knife for giving the candidate an electrical shock adjacent the knife.

9. A knife throwing illusion apparatus embodying a board having a plurality of slots, knives movable forwardly through said slots from behind the board, and selective means controlling the forward movements of said knives.

10. A knife throwing illusion apparatus embodying a board having a plurality of slots, knives mounted behind said board and movable forwardly through said slots, spring means for moving said knives forwardly, detents for normally holding the knives behind said slots, and selective means for releasing said detents.

11. A knife throwing illusion apparatus embodying a board having a slot, and a knife pivotally mounted behind said slot to swing forwardly therethrough.

12. A knife throwing illusion apparatus embodying a board having a slot, a knife pivotally mounted behind said slot to swing forwardly therethrough, and means for producing a thud when the knife is swung forwardly through said slot.

13. A knife throwing illusion apparatus embodying a board having a slot, a knife pivotally mounted behind said slot to swing forwardly therethrough, and an angularly extending member carried by the knife to contact with the board for producing a thud when the knife is swung forwardly through said slot.

14. A knife throwing illusion apparatus embodying a board having a slot, a pivotally mounted knife carried by the board behind said slot to swing forwardly therethrough, and spring means for swinging the knife forwardly through said slot.

15. A knife throwing illusion apparatus embodying a board having a slot, a pivotally mounted knife carried by the board behind said slot to swing forwardly therethrough, spring means for swinging the knife forwardly through said slot, and means for producing a thud when the knife is swung forwardly through said slot.

16. A knife throwing illusion apparatus embodying a board having a slot, a pivotally mounted knife carried by the board behind said slot to swing forwardly therethrough, spring means for swinging the knife forwardly through said slot, and an angularly extending member carried by said knife and having a portion to contact with the board when the knife is swung forwardly through said slot to produce a thud.

17. A knife throwing illusion apparatus embodying a board having a slot, a pivotally mounted knife carried by the board behind said slot to swing forwardly therethrough, spring means for swinging the knife forwardly, and detent means for normally holding the knife behind said slot.

18. A knife throwing illusion apparatus embodying a board having a plurality of slots, pivotally mounted knives carried by the board and behind said slots, spring means for swinging the knives forwardly through said slots, a detent for each knife for holding the same behind its slot, and selective means for releasing said detents.

19. A knife throwing illusion apparatus embodying a board having a slot, a knife having the end of its blade pivotally mounted behind said slot to swing forwardly therethrough, the end of said blade having an extension, spring means for swinging the blade forwardly, and a detent engageable with said extension to hold the blade behind said slot.

20. A knife throwing illusion apparatus embodying a board having a slot, a knife having the end of its blade pivotally mounted behind said slot to swing forwardly therethrough, the end of said blade having an extension, spring means for swinging the knife forwardly, a detent engageable with said extension to hold the knife behind said slot, and a member carried by said extension perpendicular therewith to contact with the board when the knife is swung forwardly through said slot for producing a thud.

21. A knife throwing illusion apparatus embodying a board having a slot, a U-shaped bearing secured to the rear surface of said board at one end of said slot and having ears at its ends, a pivot pin engaged through said ears, a knife behind said slot having the end of its blade pivotally engaged upon said pin between said ears, the end of said blade having an extension, and a spring between said extension and bearing for swinging the knife forwardly.

22. A knife throwing illusion apparatus embodying a board having a slot, a U-shaped bearing secured to the rear surface of said board at one end of said slot and having ears at its ends, a pivot pin engaged through said ears, a knife behind said slot having the end of its blade pivotally engaged upon said pin between said ears, the end of said blade having an extension, a detent engageable with said extension to hold the knife behind said slot, and a wire spring having coils embracing the end portions of said pin and a yoke connecting said coils and having its bend engaging said extension to swing the knife forwardly.

23. A knife throwing illusion apparatus embodying a board having slots, knives mounted behind said slots and movable forwardly therethrough, spring means for moving said knives forwardly, a detent for each knife to normally hold the same behind said slot, a catch for holding the detent when it is released, and a set of manually operable members connected to the detents for releasing them.

24. A knife throwing illusion apparatus embodying a board having slots, pivotally mounted knives carried by the board behind said slots to swing forwardly therethrough, a swinging detent for each knife to hold the same behind said slot, spring means for swinging said knives forwardly, and a set of levers connected to said detents and operable manually for releasing said detents.

25. A knife throwing illusion apparatus embodying a board having slots, pivotally mounted knives carried by said board behind said slots to swing forwardly therethrough, a plurality of rock shafts carried by said board, a detent carried by each rock shaft and operable for holding one knife behind its slot, a catch for holding each detent in released position, and a set of manually operable levers connected to said shafts for selectively releasing the detents.

In testimony that I claim the foregoing as my own, I have hereto affixed my signature in the presence of two witnesses.

ERASTUS DE MOULIN.

Witnesses:
H. C. Diehl,
C. H. Davis.